United States Patent
Shin et al.

(10) Patent No.: US 12,406,148 B2
(45) Date of Patent: Sep. 2, 2025

(54) METHOD, DEVICE, AND SYSTEM FOR TRACKING DIALOGUE STATE

(71) Applicant: RIIID INC., Seoul (KR)

(72) Inventors: Jamin Shin, Seoul (KR); June Young Park, Yongin-si (KR); Han Gyeol Yu, Seoul (KR); Hyeong Don Moon, Seoul (KR)

(73) Assignee: RIIID INC., Seoul (KR)

( * ) Notice: Subject to any disclaimer, the term of this patent is extended or adjusted under 35 U.S.C. 154(b) by 323 days.

(21) Appl. No.: 18/168,658

(22) Filed: Feb. 14, 2023

(65) Prior Publication Data
US 2023/0259715 A1    Aug. 17, 2023

(30) Foreign Application Priority Data
Feb. 14, 2022 (KR) ........................ 10-2022-0018594

(51) Int. Cl.
*G06F 40/35*    (2020.01)
*G06F 16/34*    (2019.01)

(52) U.S. Cl.
CPC ............ *G06F 40/35* (2020.01); *G06F 16/345* (2019.01)

(58) Field of Classification Search
CPC ...... G06F 40/35; G06F 16/345; G06F 40/186; G06F 40/205
See application file for complete search history.

(56) References Cited

U.S. PATENT DOCUMENTS

| | | | |
|---|---|---|---|
| 11,948,563 B1* | 4/2024 | Liu | G06Q 10/1095 |
| 2020/0257734 A1* | 8/2020 | Steinfort | G06F 9/451 |
| 2021/0103634 A1* | 4/2021 | Gkikas | G06F 40/211 |
| 2022/0310075 A1* | 9/2022 | Lee | G10L 15/18 |
| 2023/0063713 A1* | 3/2023 | Lukyanenko | H04L 51/046 |

FOREIGN PATENT DOCUMENTS

| | | |
|---|---|---|
| JP | 2012-185727 A | 9/2012 |
| KR | 10-2019-0096304 A | 8/2019 |

(Continued)

OTHER PUBLICATIONS

Shin, Jamin, et al. "Dialogue summaries as dialogue states (DS2), template-guided summarization for few-shot dialogue state tracking." arXiv preprint arXiv:2203.01552 (2022). (Year: 2022).*

(Continued)

*Primary Examiner* — Douglas Godbold
(74) *Attorney, Agent, or Firm* — Sughrue Mion, PLLC

(57) ABSTRACT

A method of tracking a dialogue state according to an embodiment of the present application includes: acquiring a trained dialogue state tracking model; acquiring target dialogue data; acquiring dialogue summary data from the target dialogue data using the dialogue state tracking model; and generating a dialogue state template from the dialogue summary data, in which the dialogue state tracking model includes an input layer for receiving the target dialogue data, an output layer for outputting the dialogue summary data, and a hidden layer having a plurality of nodes connecting the input layer and the output layer, and is trained using a training set that includes dialogue data and a dialogue summary sentence generated from dialogue state data related to the dialogue data.

8 Claims, 9 Drawing Sheets

(56) References Cited

FOREIGN PATENT DOCUMENTS

KR    10-2020-0103156 A    9/2020
KR       10-2398318 B1    5/2022

OTHER PUBLICATIONS

Chen, Jingxiang, et al. "Automating template creation for ranking-based dialogue models." Proceedings of the 2nd Workshop on Natural Language Processing for Conversational AI. 2020. (Year: 2020).*

Kyo-Joong Oh et al., "Real-time Text Analysis with Dialogue State Tracking and Summarizing to Assist Emergency Call Reporting", Korean Information Science Society Language Engineering Research Society 2021, The 33rd Hangeul and Korean Information Processing Conference, Oct. 14, 2021, pp. 16-21.

Hyunmin Jeon et al., "Multi Domain Dialog State Tracking using Domain State", Annual Conference on Human and Language Technology (Korean Information Science Society Language Engineering Research Society: Conference Proceedings (Korean Language and Korean Information Processing)), Oct. 14, 2020, pp. 421-426.

* cited by examiner

METHOD, DEVICE, AND SYSTEM FOR TRACKING DIALOGUE STATE

CROSS-REFERENCE TO RELATED APPLICATION

This application claims priority to and the benefit of Korean Patent Application No. 2022-0018594, filed on Feb. 14, 2022, the disclosure of which is incorporated herein by reference in its entirety.

BACKGROUND

1. Field of the Invention

The present application relates to a method, device, and system for tracking a dialogue state. More particularly, the present application relates to a method, device, and system for tracking a dialogue state using a dialogue summary sentence generated from dialogue state data and a dialogue state tracking model trained through a training set.

2. Discussion of Related Art

As artificial intelligence technologies develop, the artificial intelligence technologies are being used in various industries. In particular, in the field of language analysis technology, natural language analysis is performed using a language model incorporating the artificial intelligence technology, and the development of technologies for predicting a word sequence or a sentence sequence or technologies for tracking a dialogue state indicating which state the dialogue is in is being actively researched.

Conventionally, studies for tracking a dialogue state using a statistical language model (e.g., seq2seq) that employs a method of mapping dialogue data with desired information or tracking a dialogue state by adopting a question-answer system to directly query information to be tracked based on the dialogue data have been conducted.

However, the technology of tracking the dialogue state using the statistical language model has limitations in that the statistical language model should be trained with a considerable amount of training data and cost in order to be able to interpret the dialogue state information latent in the dialogue data. In addition, since the technology of tracking the dialogue state using the question-answer system essentially requires a process of generating a considerable number of question-answer pairs, and a process of "creating" a question-answer model to predict a dialogue state, and "verifying" the accuracy of a model, there is a limitation that relatively great amount of computation is required.

Therefore, the development of a new method, device, and system for tracking a dialogue state is required.

SUMMARY OF THE INVENTION

The present invention is directed to providing a method, device, and system for tracking a dialogue state for training a dialogue state tracking model using an artificially generated dialogue summary sentence as a training set.

The present invention is directed to providing a method, device, and system for tracking a dialogue state by generating a dialogue state template from dialogue summary data.

Objects to be solved by the present disclosure are not limited to the above-mentioned objects, and objects that are not mentioned will be clearly understood by those skilled in the art to which the present disclosure pertains from the present specification and the accompanying drawings.

According to an aspect of the present application, there is provided a method of tracking a dialogue state, which is performed by a device for tracking a dialogue state that acquires target dialogue data and generates a dialogue state template based on the target dialogue data, the method including: acquiring a trained dialogue state tracking model; acquiring target dialogue data; acquiring dialogue summary data from the target dialogue data using the dialogue state tracking model; and generating a dialogue state template from the dialogue summary data, in which the dialogue state tracking model may include an input layer for receiving the target dialogue data, an output layer for outputting the dialogue summary data, and a hidden layer having a plurality of nodes connecting the input layer and the output layer, and may be trained using a training set that includes dialogue data and a dialogue summary sentence generated from dialogue state data related to the dialogue data.

According to another aspect of the present application, there is provided a device for tracking a dialogue state, the device including: a transceiver configured to acquire the dialogue data; and a controller configured to acquire the dialogue data through the transceiver and generate the dialogue state template based on the dialogue data, in which the controller is configured to acquire target dialogue data, acquire a trained dialogue state tracking model, acquire dialogue summary data from the target dialogue data using the dialogue state tracking model, and generate the dialogue state template from the dialogue summary data, and the dialogue state tracking model includes an input layer for receiving the target dialogue data, an output layer for outputting the dialogue summary data, and a hidden layer having a plurality of nodes connecting the input layer and the output layer and is trained using a training set that includes dialogue data and a dialogue summary sentence generated from dialogue state data related to the dialogue data.

Technical solutions of the present disclosure are not limited to the abovementioned solutions, and solutions that are not mentioned will be clearly understood by those skilled in the art to which the present disclosure pertains from the present specification and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
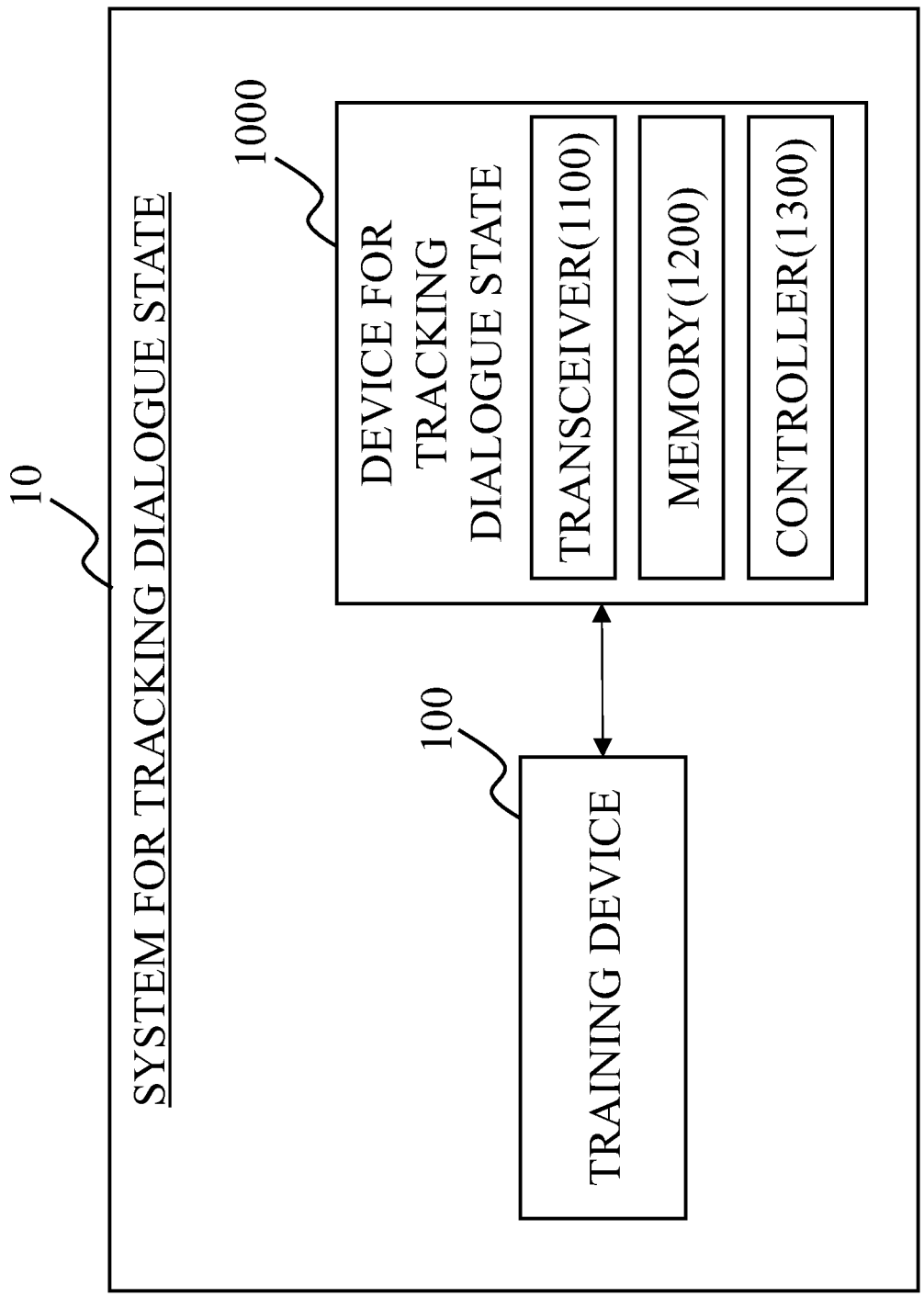
FIG. 1 is a schematic diagram of a system for tracking a dialogue state according to an embodiment of the present application.

Objects, features, and advantages of the present application will become more apparent from the following detailed description provided in conjunction with the accompanying drawings. However, the present application may be variously modified and have several exemplary embodiments. Hereinafter, specific exemplary embodiments of the present invention will be illustrated in the accompanying drawings and described in detail.

In principle, like reference numerals denote like constituent elements throughout the specification. Further, elements having the same function within the scope of the same idea illustrated in the drawings of each embodiment will be described using the same reference numerals, and overlapping descriptions thereof will be omitted.

When it is determined that a detailed description for known functions or configurations related to the present application may obscure the gist of the present disclosure, detailed descriptions thereof will be omitted. In addition, numbers (for example, first, second, etc.) used in the description process of the present specification are only identifiers for distinguishing one component from other components.

In addition, suffixes "module" and "unit" for components used in the following embodiments are used only in order to easily make the disclosure. Therefore, these terms do not have meanings or roles that distinguish from each other by themselves.

In the following embodiments, singular forms include plural forms unless the context clearly dictates otherwise.

In the following embodiments, the terms "include" or "have" means that a feature or element described in the specification is present, and therefore, do not preclude in advance the possibility that one or more other features or components may be added.

Sizes of components may be exaggerated or reduced in the accompanying drawings for convenience of explanation. For example, the size and thickness of each component illustrated in the drawings are arbitrarily shown for convenience of description, and the present invention is not necessarily limited to what is shown.

In a case where certain embodiments can be implemented otherwise, the order of specific processes may be performed different from the order in which the processes are described. For example, two processes described in succession may be performed substantially simultaneously, or may be performed in an order opposite to the order described.

In the following embodiments, when components are connected, it includes not only a case where components are directly connected but also a case where components are indirectly connected via a component interposed between the components.

For example, in the present specification, when components and the like are electrically connected, it includes not only a case where components are directly electrically connected, but also a case where components are indirectly electrically connected via a component interposed between the components.

A method of tracking a dialogue state by a device for tracking a dialogue state that acquires target dialogue data and generates a dialogue state template based on the target dialogue data includes: acquiring a trained dialogue state tracking model; acquiring target dialogue data; acquiring dialogue summary data from the target dialogue data using the dialogue state tracking model; and generating a dialogue state template from the dialogue summary data, in which the dialogue state tracking model includes an input layer for receiving the target dialogue data, an output layer for outputting the dialogue summary data, and a hidden layer having a plurality of nodes connecting the input layer and the output layer, and is trained using a training set that includes dialogue data and a dialogue summary sentence generated from dialogue state data related to the dialogue data.

The generating of the dialogue state template may include: identifying a target sentence prefix included in the dialogue summary data; determining a target domain related to the target summary data based on the identified target sentence prefix; extracting at least one target sentence related to the target domain from among a plurality of sentences included in the dialogue summary data; and generating the dialogue state template based on the extracted target sentence.

The generating of the dialogue state template may include: acquiring a reference sequence related to the target domain; acquiring a sequence of interest of the target sentence corresponding to the reference sequence by comparing the reference sequence with the target sentence and acquiring a slot value based on the target sequence related to the sequence of interest; acquiring a slot name related to the reference sequence; and generating the dialogue state template based on the slot name and the slot value.

The dialogue state tracking model may be configured to receive the dialogue data through the input layer and output a dialogue summary prediction value through the output layer during training, and may be trained by updating a parameter of at least one node included in the dialogue state tracking model based on a similarity between the dialogue summary prediction value and the dialogue summary sentence.

The dialogue summary sentence may be generated based on a slot value corresponding to a slot name included in the dialogue state data, a reference sequence related to the slot name, and a sentence prefix related to a domain included in the dialogue state data.

The dialogue summary sentence may be generated by assigning the slot value to a predetermined sequence of the reference sequence and assigning the sentence prefix to a sequence preceding the reference sequence.

According to an embodiment of the present application, a computer-readable recording medium on which a program for executing the method of tracking a dialogue state is recorded may be provided.

A device for tracking a dialogue state includes: a transceiver configured to acquire the dialogue data; and a controller configured to acquire the dialogue data through the transceiver and generate the dialogue state template based on the dialogue data, in which the controller may be configured to acquire the target dialogue data, acquire a trained dialogue state tracking model, acquire dialogue summary data from the target dialogue data using the dialogue state tracking model, and generate a dialogue state template from the dialogue summary data, and the dialogue state tracking model may include an input layer for receiving the target dialogue data, an output layer for outputting the dialogue summary data, and a hidden layer having a plurality of nodes connecting the input layer and the output layer and is trained using a training set that includes dialogue data and a dialogue summary sentence generated from dialogue state data related to the dialogue data.

Hereinafter, a method, device, and system for tracking a dialogue state according to embodiments of the present application will be described with reference to FIGS. 1 to 9.

FIG. 1 is a schematic diagram of a system 10 for tracking a dialogue state according to an embodiment of the present application. A system 10 for tracking a dialogue state according to an embodiment of the present application may include a training device 100 and a device 1000 for tracking a dialogue state.

The training device 100 may perform an operation of training a dialogue state tracking model. Specifically, the training device 100 may be configured to train a neural network model using a training set that includes dialogue data and a dialogue summary sentence generated from dialogue state data related to the dialogue data. In addition, the training device 100 may transmit the trained dialogue state tracking model and/or execution data for executing the dialogue state tracking model to the device 1000 for tracking a dialogue state.

The device 1000 for tracking a dialogue state may be configured to generate a dialogue state template from the target dialogue data using the trained dialogue state tracking model. Specifically, the device 1000 for tracking a dialogue state may acquire the trained dialogue state tracking model and the target dialogue data, and acquire the dialogue summary sentence from the target dialogue data through the dialogue state tracking model. In addition, the device 1000 for tracking a dialogue state may be configured to generate the dialogue state template from the dialogue summary sentence.

The device 1000 for tracking a dialogue state according to the embodiment of the present application may include a transceiver 1100, a memory 1200, and a controller 1300.

The transceiver 1100 may communicate with any external device including the training device 100. For example, the device 1000 for tracking a dialogue state may receive the trained dialogue state tracking model and/or the execution data for executing the dialogue state tracking model from the training device 100 through the transceiver 1100.

The device 1000 for tracking a dialogue state may transmit/receive various types of data by accessing a network through the transceiver 1100. The transceiver 1100 may largely include a wired type and a wireless type. Since the wired type and the wireless type each have strengths and weaknesses, in some cases, the wired type and the wireless type may be simultaneously provided in the device 1000 for tracking a dialogue state. Here, in the case of the wireless type, a wireless local area network (WLAN)-based communication method such as Wi-Fi may be mainly used. Alternatively, in the case of the wireless type, cellular communication, for example, a long term evolution (LTE) and 5G-based communication method may be used. However, the wireless communication protocol is not limited to the above-described example, and any suitable wireless type communication method may be used. In the case of the wired type, local area network (LAN) or universal serial bus (USB) communication is a representative example, and other methods are also possible.

The memory 1200 may store various types of information. Various types of data may be temporarily or semi-permanently stored in the memory 1200. An example of the memory 1200 may include a hard disk drive (HDD), a solid state drive (SSD), a flash memory, a read-only memory (ROM), a random access memory (RAM), or the like. The memory 1200 may be provided in a form embedded in the device 1000 for tracking a dialogue state or in a detachable form. Various types of data necessary for operating the device 1000 for tracking a dialogue state as well as an operating system (OS) for driving the device 1000 for tracking a dialogue state or a program for operating each configuration of the device 1000 for tracking a dialogue state may be stored in the memory 1200.

The controller 1300 may control the overall operation of the device 1000 for tracking a dialogue state. For example, the controller 1300 may control the overall operation of the device 1000 for tracking a dialogue state, including an operation of acquiring the trained dialogue state tracking model to be described below, an operation of acquiring the target dialogue data, an operation of acquiring the dialogue summary data from target dialogue data using the dialogue state tracking model, and/or an operation of generating the dialogue state template from the dialogue summary data, and the like. Specifically, the controller 1300 may load and execute a program for the overall operation of the device 1000 for tracking a dialogue state from the memory 1200. The controller 1300 may be implemented as an application processor (AP), a central processing unit (CPU), or a device similar thereto according to hardware, software, or a combination thereof. In this case, the controller 1300 may be provided in the form of an electronic circuit processing an electrical signal to perform a control function in terms of hardware, and may be provided in the form of a program or code driving the hardware circuit in terms of software.

Meanwhile, in FIG. 1, the device 1000 for tracking a dialogue state and the training device 100 are illustrated as separate devices. However, this is only an example for convenience of description, and the device 1000 for tracking a dialogue state and the training device 100 may be integrally configured. For example, the device 1000 for tracking a dialogue state may include a training module, and may be configured to train the above-described dialogue state tracking model through the training module.

Figure 2:
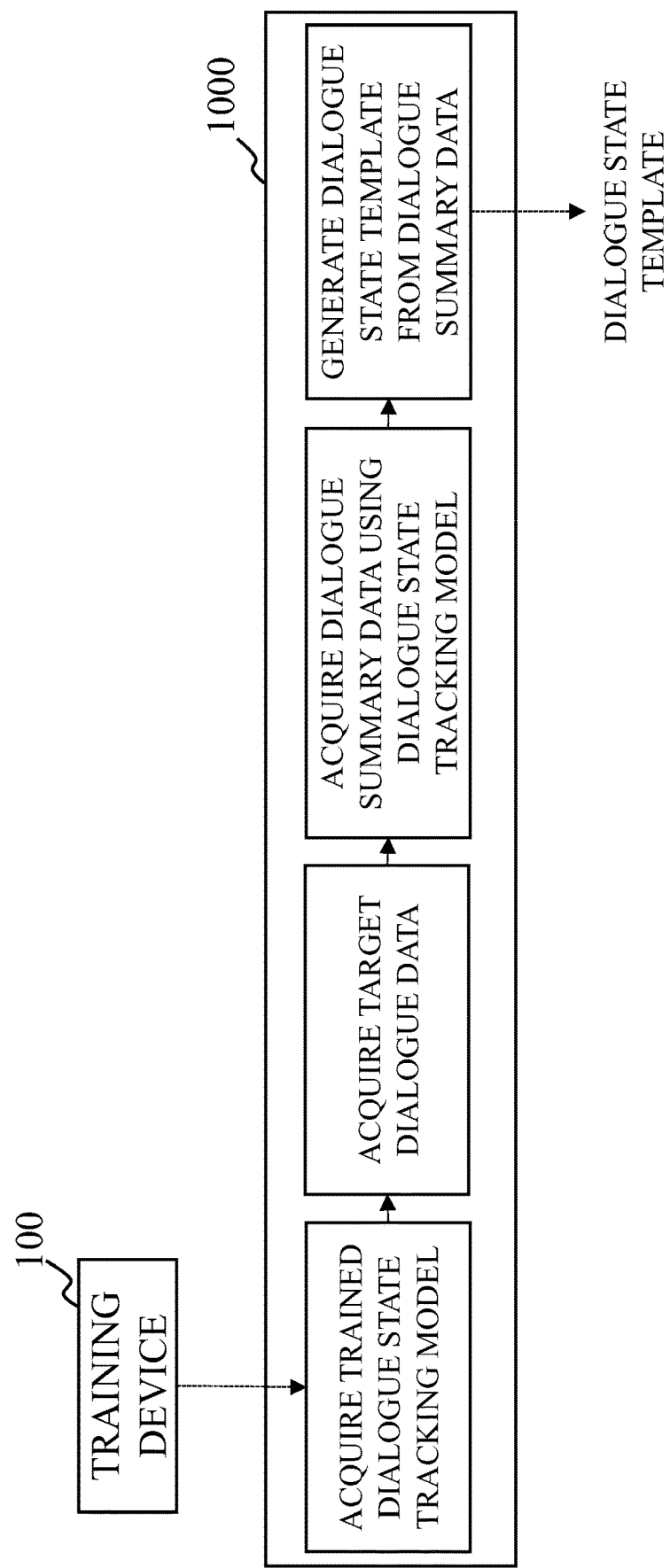
FIG. 2 is a diagram illustrating an operation of a device for tracking a dialogue state according to an embodiment of the present application.

Hereinafter, with reference to FIG. 2, the operation of the device 1000 for tracking a dialogue state of the system 10 for tracking a dialogue state according to the embodiment of the present application for achieving the above-described objects and effects will be described in detail. FIG. 2 is a diagram illustrating the operation of the device 1000 for tracking a dialogue state according to an embodiment of the present application.

The device 1000 for tracking a dialogue state according to the embodiment of the present application may acquire the trained dialogue state tracking model or the execution data for executing the trained dialogue state tracking model. For example, the device 1000 for tracking a dialogue state may acquire the trained dialogue state tracking model or the execution data for executing the dialogue state tracking model from the training device 100 through the transceiver 1100. In this case, the execution data may include arbitrary information for executing the dialogue state tracking model, including layer information related to the structure of the dialogue state tracking model and/or parameter information of nodes included in the dialogue state tracking model.

The device 1000 for tracking a dialogue state according to the embodiment of the present application may acquire the target dialogue data. Here, the target dialogue data may include any type of data related to voice and/or text representing an arbitrary dialogue.

The device 1000 for tracking a dialogue state according to the embodiment of the present application may acquire the dialogue summary data from the target dialogue data using the dialogue state tracking model. Specifically, the dialogue state tracking model includes an input layer for receiving the target dialogue data, an output layer for outputting the dialogue summary data, and a hidden layer having a plurality of nodes connecting the input layer and the output layer. In this case, the device 1000 for tracking a dialogue state may input the target dialogue data to the dialogue state tracking model through the input layer and acquire the dialogue summary data output through the output layer of the dialogue state tracking model.

Meanwhile, the dialog state tracking model may be trained using the training set that includes the dialog data and the dialog summary sentence related to the dialog data. According to an example, the dialogue summary included in the training set may be generated from the dialogue state data related to the dialogue data. Specifically, the training device 100 may input the training set including the dialogue data to the input layer of the dialogue state tracking model, acquire the dialogue summary prediction value output through the output layer, and repeatedly update parameters of at least one node included in the dialogue state tracking model based on the similarity or difference between the dialogue summary prediction value and the dialogue summary, thereby training the dialogue state tracking model.

Contents of acquiring the dialogue summary data using the dialogue state tracking model and a method of training a dialogue state tracking model will be described in detail with reference to FIGS. 3 to 5.

The device 1000 for tracking a dialogue state according to the embodiment of the present application may perform an operation of generating the dialogue state template based on the dialogue summary data acquired through the dialogue state tracking model. Specifically, the device 1000 for tracking a dialogue state may acquire reference template information, and generate the dialogue state template based on the dialogue summary data and the reference template information. For example, the device 1000 for tracking a dialogue state may identify a target sentence prefix corresponding to a reference sentence prefix included in the dialogue summary data based on a reference sentence prefix included in the reference template information. In addition, the device 1000 for tracking a dialogue state may determine a target domain indicating a dialogue topic related to the target summary data based on the identified target prefix. In addition, the device 1000 for tracking a dialogue state may extract at least one target sentence related to the target domain from among a plurality of sentences included in the dialogue summary data, and generate the dialogue state template based on the extracted target sentence.

Contents of generating the dialogue state template from the dialogue summary data will be described in detail with reference to FIGS. 6 to 9.

Hereinafter, the method of tracking a dialogue state according to the embodiment of the present application will be described in more detail with reference to FIGS. 3 to 9. In the description of the method of tracking a dialogue state, some embodiments overlapping with the description of the operation of the device 1000 for tracking a dialogue state described above may be omitted, but this is only for convenience of description and should not be construed as limiting.

Figure 3:
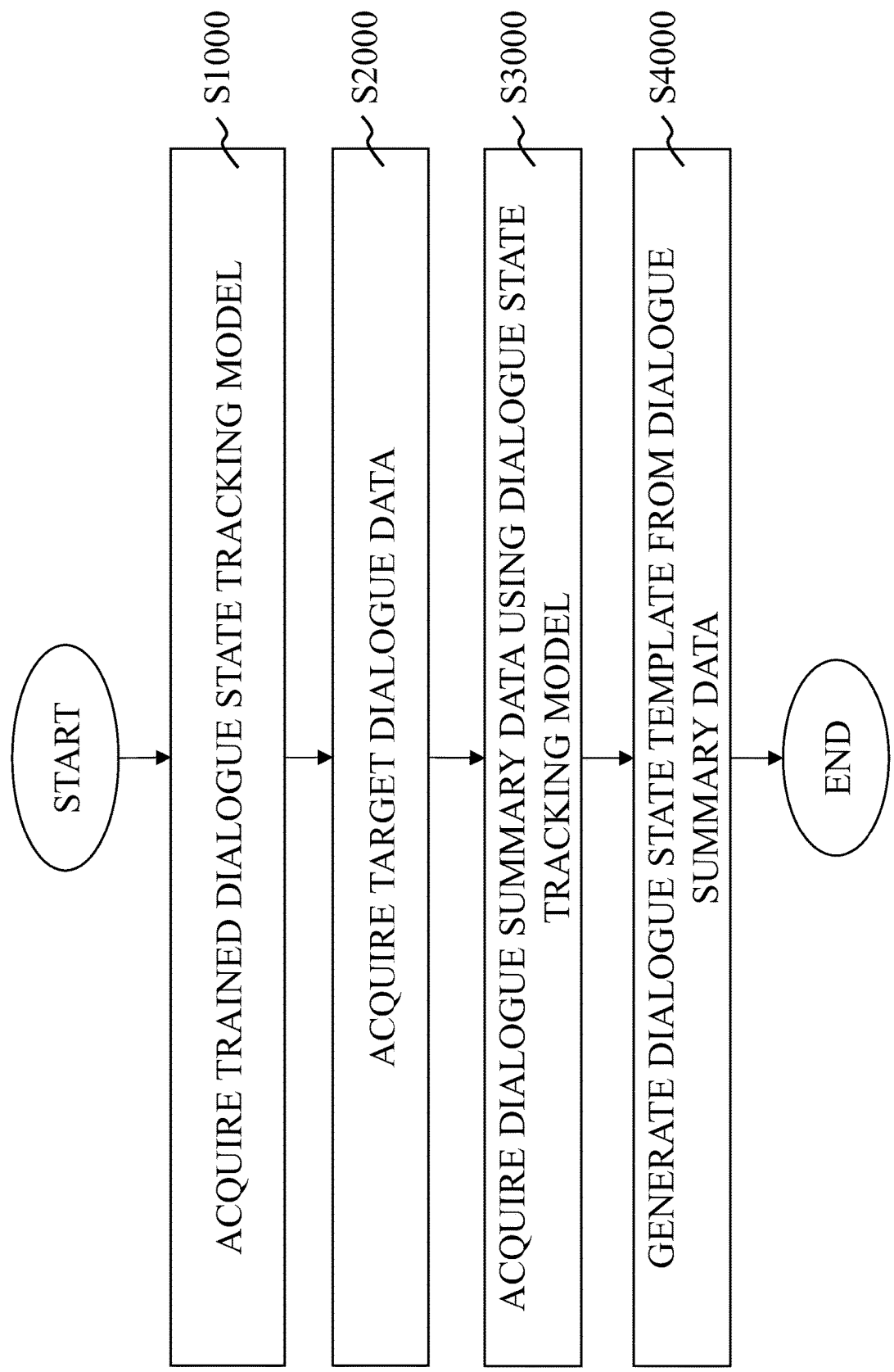
FIG. 3 is a flowchart of a method of tracking a dialogue state according to an embodiment of the present application.

FIG. 3 is a flowchart illustrating the method of tracking a dialogue state according to an embodiment of the present application.

The method of tracking a dialogue state according to an embodiment of the present application may include acquiring the trained dialogue state tracking model (S1000), acquiring the target dialogue data (S2000), acquiring the dialogue summary data using the dialogue state tracking model (S3000), and generating the dialogue state template from the dialogue summary data (S4000).

In the acquiring of the trained dialogue state tracking model (S1000) according to the embodiment of the present application, the device 1000 for tracking a dialogue state may acquire the trained dialogue state tracking model or the execution data for executing the trained dialogue state tracking model. Here, the execution data may include arbitrary information to execute the dialogue state tracking mode, including layer information related to the structure of the dialogue state tracking model and/or parameter information of nodes included in the dialogue state tracking model, as described above.

In the acquiring of the target dialogue data (S2000) according to the embodiment of the present application, the device 1000 for tracking a dialogue state may acquire the target dialogue data which is dialogue data to be analyzed. The target dialogue data may mean encompassing data in any form (e.g., text, vector, matrix, number, etc.) related to voice and/or text representing an arbitrary dialogue.

In the acquiring of the dialogue summary data using the dialogue state tracking model (S3000) according to the embodiment of the present application, the device 1000 for tracking a dialogue state may acquire the dialogue summary data from the target dialogue data through the dialogue state tracking model.

Figure 4:
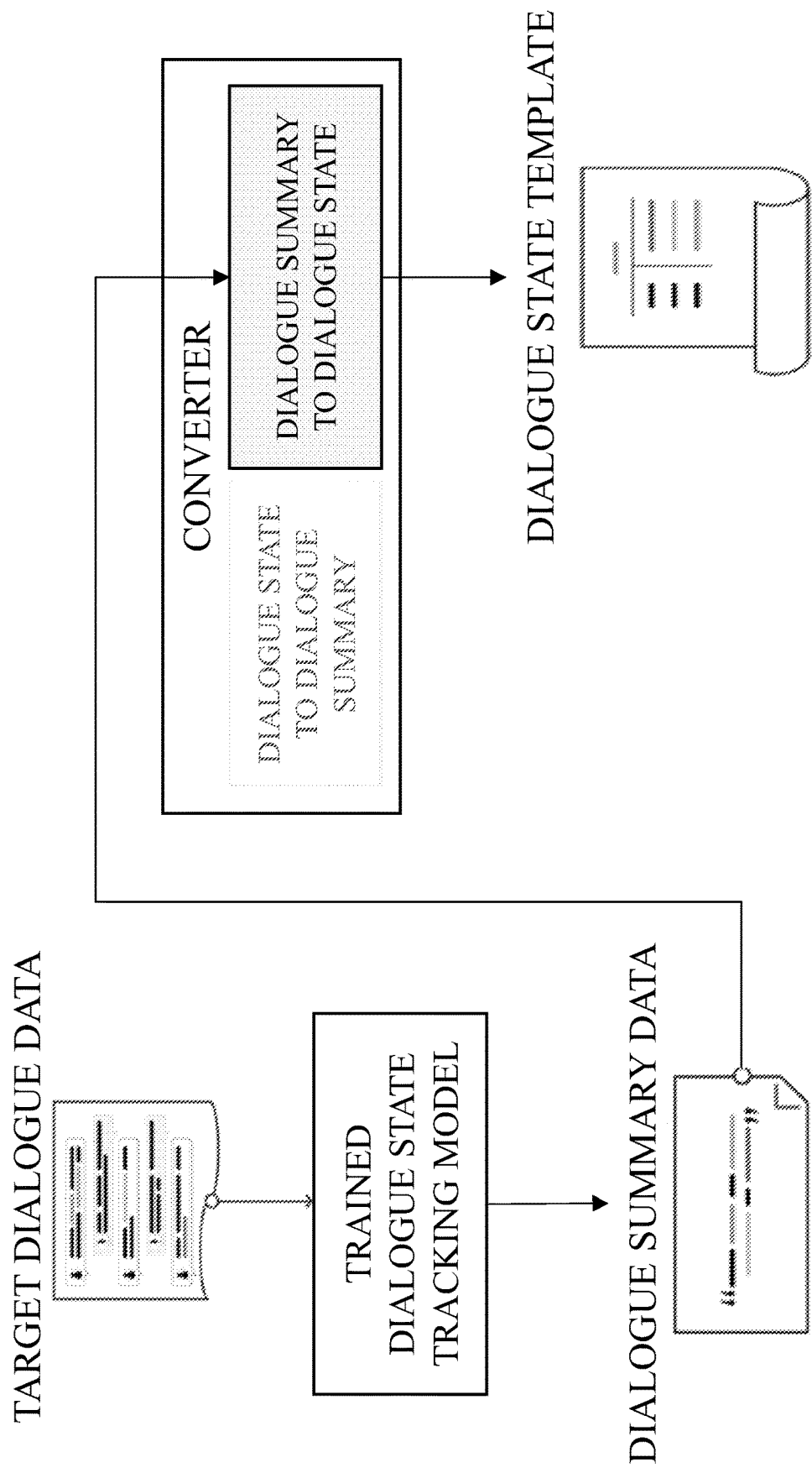
FIG. 4 is a diagram illustrating an aspect of generating a dialogue state template using a dialogue state tracking model according to an embodiment of the present application.

FIG. 4 is a diagram illustrating an aspect of generating a dialogue state template using a dialogue state tracking model according to an embodiment of the present application.

The dialogue state tracking model may include the input layer for receiving the target dialogue data, the output layer for outputting the dialogue summary data, and the hidden layer having a plurality of nodes connecting the input layer and the output layer. In this case, the device 1000 for tracking a dialogue state may input the target dialogue data to the dialogue state tracking model through the input layer and acquire the dialogue summary data output through the output layer of the dialogue state tracking model. In this case, as described below, the dialogue state tracking model is trained by updating the parameters of the nodes from the dialogue data to minimize the difference between the predicted dialogue summary and the dialogue summary, so the trained dialogue state tracking model may receive the target dialogue data to output the dialogue summary data. Here, the device 1000 for tracking a dialogue state may acquire the dialogue summary data output through the output layer of the dialogue state tracking model.

Hereinafter, an aspect of training the dialogue state tracking model according to the embodiment of the present application will be described in detail with reference to FIG. 5. The operation of training the dialogue state tracking model may be implemented in the training device 100. However, as described above, the device 1000 for tracking a dialogue state and the training device 100 may be integrally configured. In this case, the device 1000 for tracking a dialogue state may perform the operation of training the dialogue state tracking model.

Figure 5:
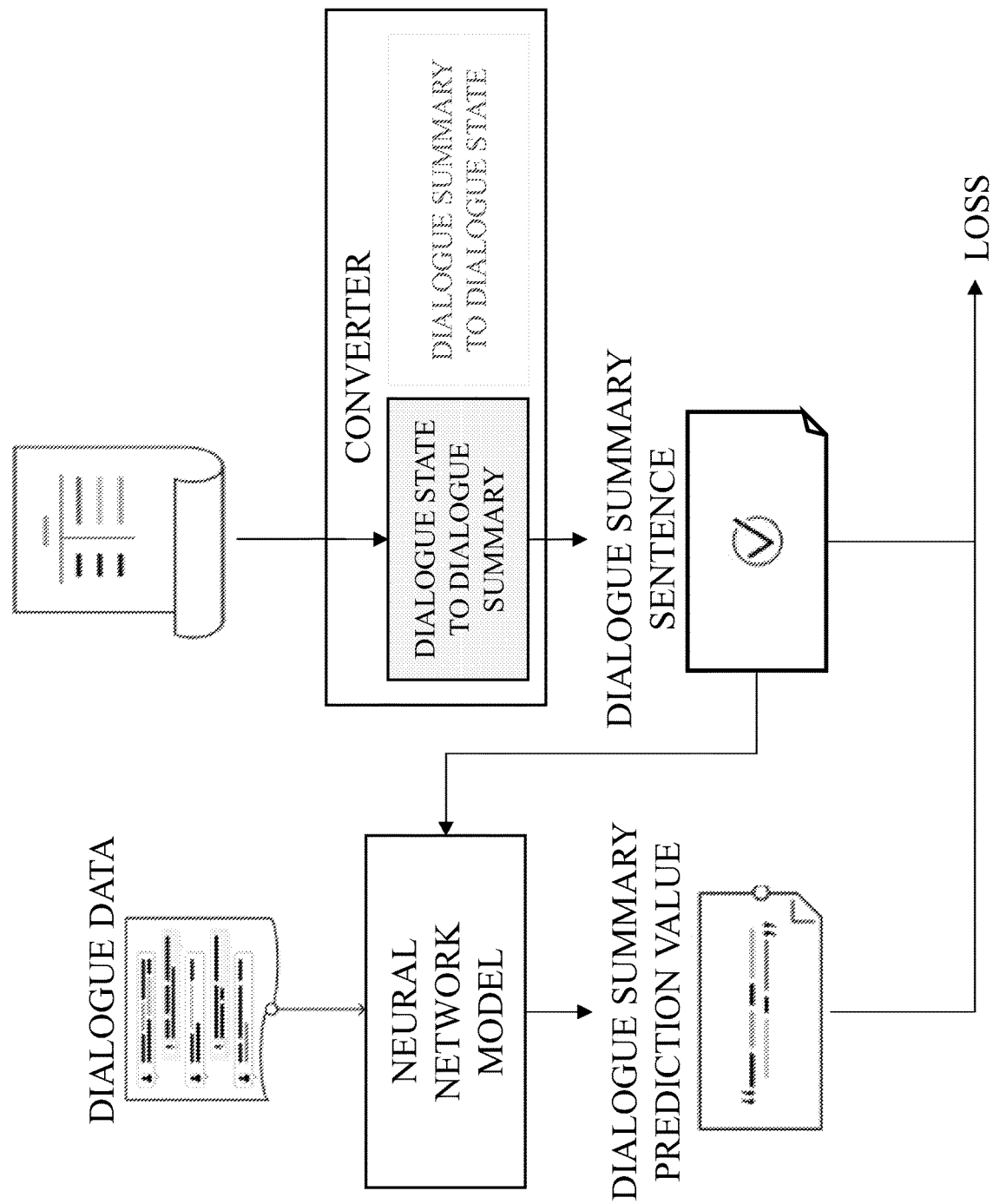
FIG. 5 is a diagram illustrating an aspect of training a dialogue state tracking model according to an embodiment of the present application.

FIG. 5 is a diagram illustrating an aspect of training the dialogue state tracking model according to the embodiment of the present application.

The dialog state tracking model may be trained using the training set that includes the dialog data and the dialog summary sentence related to the dialog data. For example, the dialogue summary sentence may be generated from dialogue state data automatically or manually generated from dialogue data. For example, the training device 100 may acquire the dialogue summary from the dialogue state data through a converter.

In this case, the training device 100 may input the training set including the dialogue data and/or the dialogue summaries to the input layer of the dialogue state tracking model, acquire the dialogue summary prediction value output through the output layer, and train the dialogue state tracing model by repeatedly updating parameters of at least one node included in the dialogue state tracking model based on the similarity (or difference) between the dialogue summary prediction value and the dialogue summary sentence so that the similarity between the dialogue summary prediction value and the dialogue summary sentence is maximized (or the difference is minimized).

Meanwhile, the converter may generate the dialogue summary based on the dialogue state data using a pre-trained language model (PLM) that summarizes dialogue. For example, the converter may be the PLM, and the PLM may be BERT, ROBERTA, BART, or Seq2seq. As an example, the converter may be configured to generate the dialogue summary sentence from the dialogue state data based on the template. In this regard, it will be described in more detail in FIGS. 6 to 9.

Referring back to FIG. 3, the method of tracking a dialogue state according to the embodiment of the present application may include generating the dialogue state template from the dialogue summary data (S4000).

In the generating of the dialogue state template from the dialogue summary data (S4000) according to the embodiment of the present application, the device 1000 for tracking a dialogue state may perform an operation of generating the dialogue state template based on the dialogue summary data acquired through the dialogue state tracking model. For example, the device 1000 for tracking a dialogue state may acquire the dialogue state template based on the dialogue summary data using the converter that is trained or configured to generate the dialogue state template based on the dialogue summary data. As an example, the converter may be configured to generate the dialogue state template based on the dialogue summary data based on the template.

Hereinafter, contents of generating the dialogue state template according to the embodiment of the present application will be described in more detail with reference to FIGS. 6 and 7.

Figure 6:
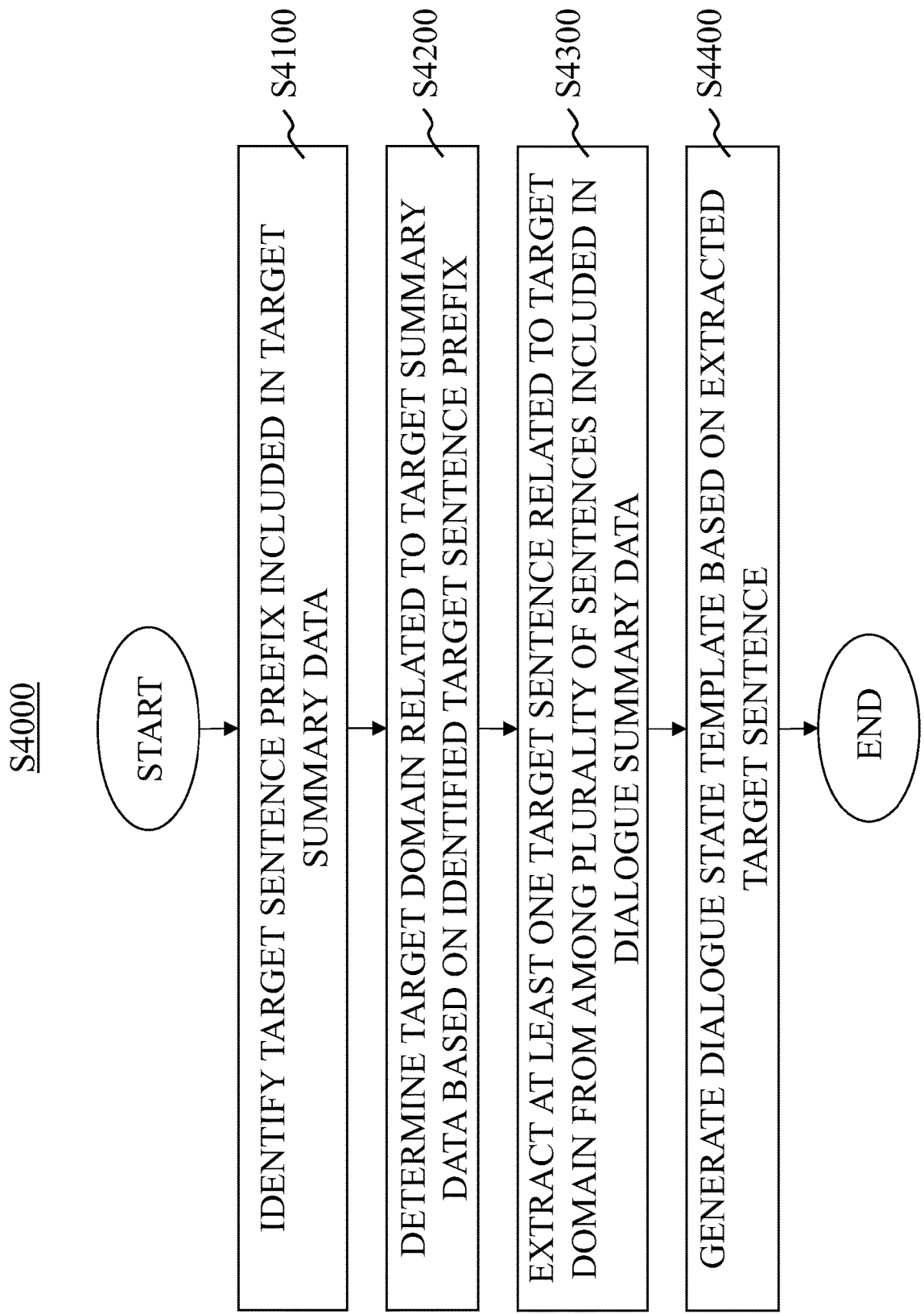
FIG. 6 is a flowchart embodying an operation of generating a dialogue state template according to an embodiment of the present application.

FIG. 6 is a flowchart embodying the operation of generating the dialogue state template (S4000) according to the embodiment of the present application. FIG. 7 is a diagram for describing an aspect of generating the dialogue state template according to the embodiment of the present application.

The generating of the dialogue state template according to the embodiment of the present application (S4000) may include identifying a target sentence prefix included in the dialogue summary data (S4100), determining a target domain related to the target summary data based on the identified target sentence prefix (S4200), extracting at least one target sentence related to the target domain from among a plurality of sentences included in the dialogue summary data (S4300), and generating the dialogue state template based on the extracted target sentence (S4400).

In the identifying of the target sentence prefix included in the dialogue summary data (S4100) according to the embodiment of the present application, the device 1000 for tracking a dialogue state may identify the target sentence prefix included in the dialogue summary data. In detail, the device 1000 for tracking a dialogue state may acquire reference template information. The reference template information may include domain information related to a dialogue topic, reference sentence prefix information preset for each domain, slot name information preset for each domain, and/or reference sequence information corresponding to each slot name. For example, reference template information related to an attraction domain may include reference sentence prefix information (e.g., The user is looking for an attraction), preset for the attraction domain, at least one slot name (e.g., attraction-area, attraction-name, attraction-type, etc.), reference sequence information (e.g., a first reference sequence ("located in the _") corresponding to the first slot name (attraction-area), a second reference sequence ("called _") corresponding to the second slot name (attraction-name), and a third reference sequence ("which is _") corresponding to the third slot name (attraction-type)).

In this case, the device 1000 for tracking a dialogue state may identify the target sentence prefix based on the reference sentence prefix included in the dialogue summary data and the reference template information. Specifically, the device 1000 for tracking a dialogue state may compare the dialogue summary data and the reference sentence prefix to identify the target sentence prefix corresponding to the reference sentence prefix included in the dialogue summary data.

In the determining of the target domain related to the target summary data based on the identified target sentence prefix according to the embodiment of the present application (S4200), the device 1000 for tracking a dialogue state may determine the target domain representing the dialogue topic related to the dialogue summary data based on the target sentence prefix identified from the dialogue summary data.

Figure 7:
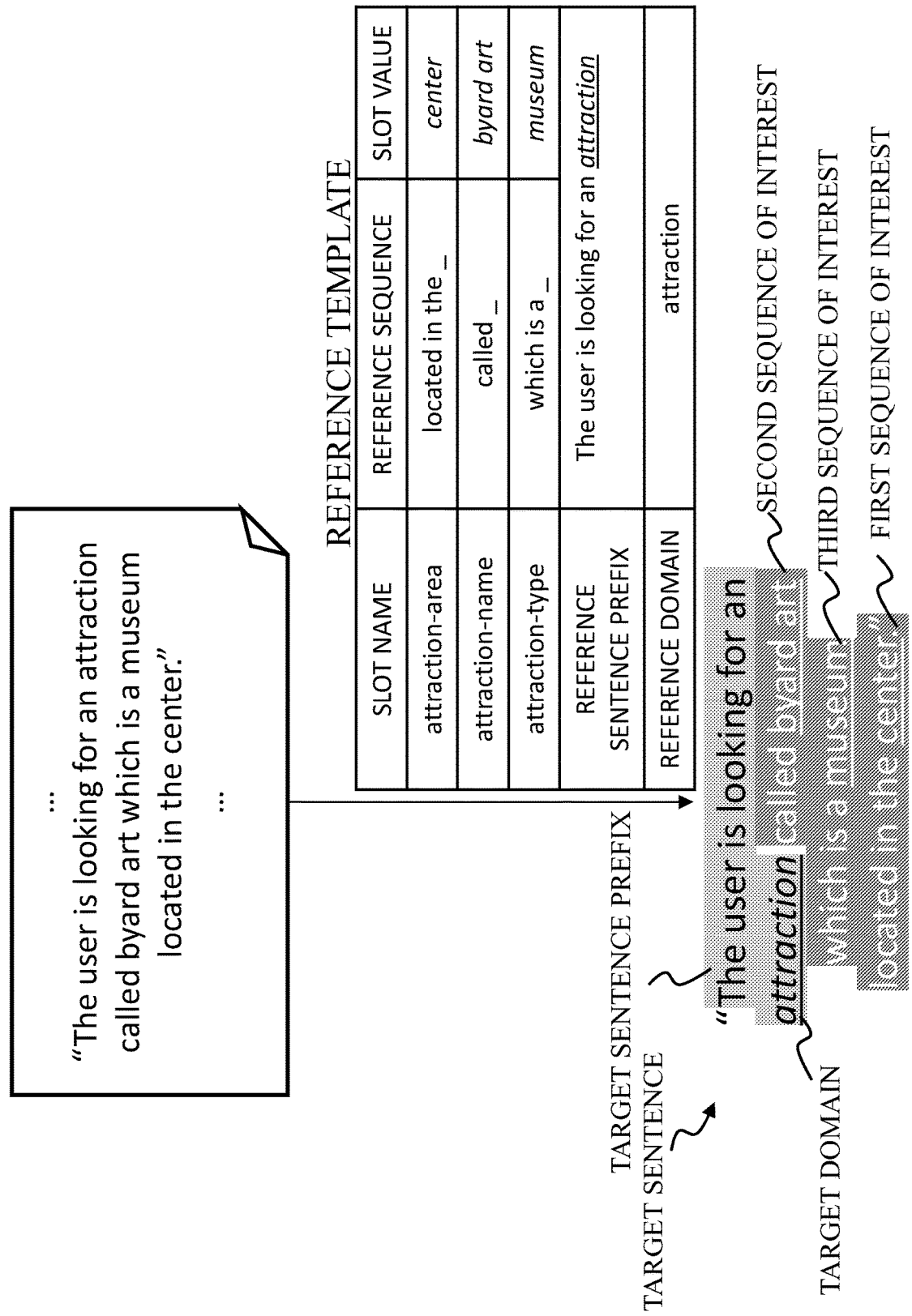
FIG. 7 is a diagram for describing an aspect of generating a dialogue state template according to an embodiment of the present application.

For example, when the reference sentence prefix and the target sentence prefix correspond to each other, the device 1000 for tracking a dialogue state may determine the target domain of the dialogue summary data based on the domain information (reference domain (attraction) of FIG. 7) of the reference template information related to the reference sentence prefix.

As another example, the reference sentence prefix may include the domain sequence (domain sequence (attraction) included in the reference sentence prefix of FIG. 7). In this case, the device 1000 for tracking a dialogue state may determine the target domain of the dialogue summary data based on the domain sequence included in the reference sentence prefix when the reference sentence prefix and the target sentence prefix correspond to each other.

In the extracting of at least one target sentence related to the target domain from among a plurality of sentences included in the dialogue summary data (S4300) according to the embodiment of the present application, the device 1000 for tracking a dialogue state may extract at least one target sentence related to the target domain from among a plurality of sentences included in dialogue summary data based on the determined target domain. For example, the device 1000 for tracking a dialogue state may extract at least one target sentence (for example, "The user is looking for an attraction called Byard Art which is a museum located in the center." in FIG. 7) related to the target domain from among the plurality of sentences included in the dialogue summary data, based on the target domain related to the attraction of FIG. 7.

In the generating of the dialogue state template based on the extracted target sentence (S4400) according to the embodiment of the present application, the device 1000 for tracking a dialogue state may generate the dialogue state template based on the extracted target sentence. Specifically, the device 1000 for tracking a dialogue state may acquire at least one sequence of interest (e.g., the first sequence of interest ("located in the center"), the second sequence of interest ("called Byard Art"), and the third sequence of interest ("which is a museum") of FIG. 7) included in the extracted target sentence, acquire the target sequence (e.g., "Byard Art," "museum," "center," in FIG. 7) related to the sequence of interest, and generate the dialogue state template based on the target sequence and the slot name (e.g., "attraction-area," "attraction-name," and "attraction-type" of FIG. 7) included in the reference template information.

Hereinafter, the contents of generating the dialogue state template according to the embodiment of the present application will be described in more detail with reference to FIGS. 8 and 9.

Figure 8:
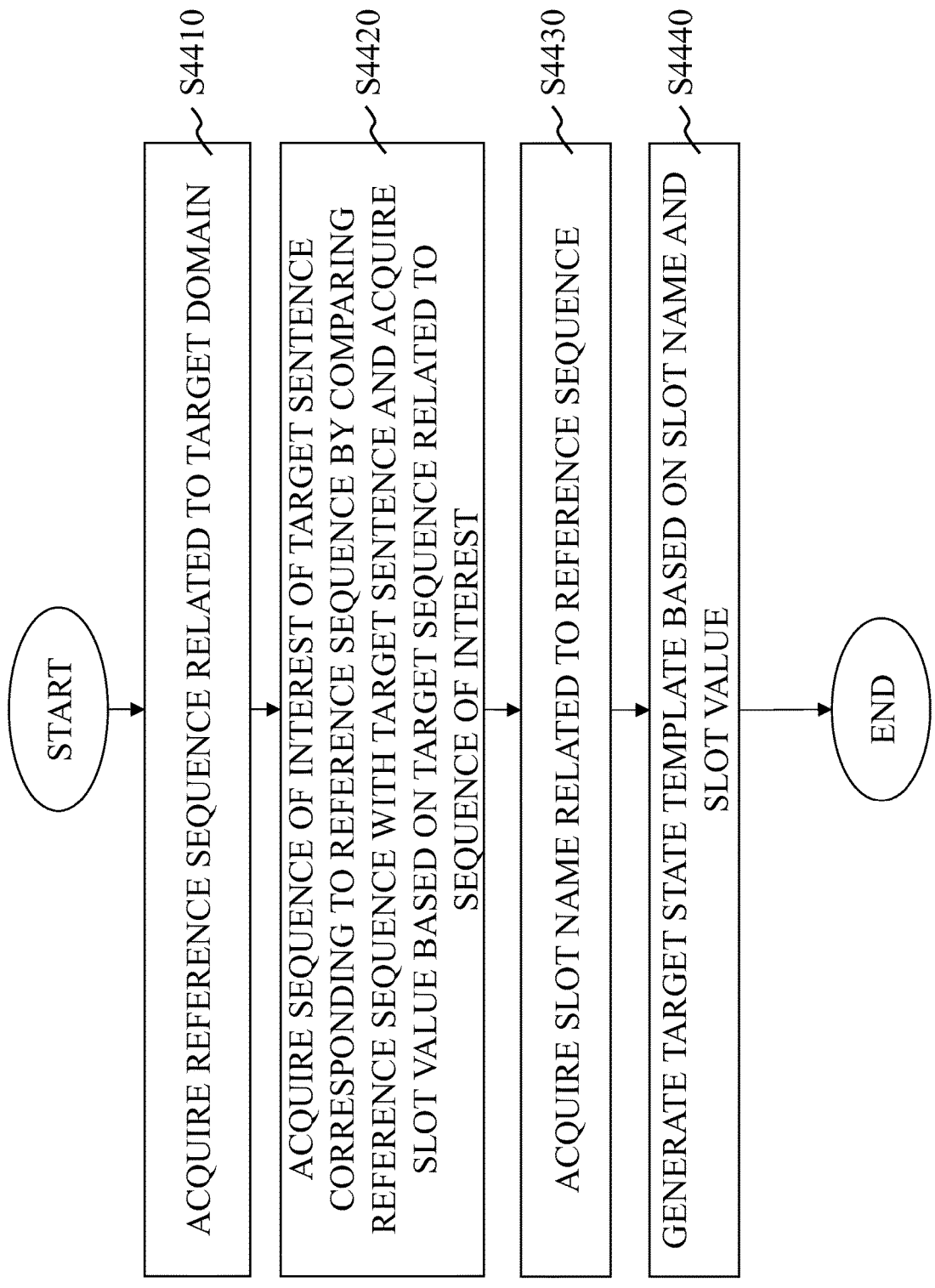
FIG. 8 is a flowchart embodying an operation of generating a dialogue state template according to an embodiment of the present application.
Figure 9:
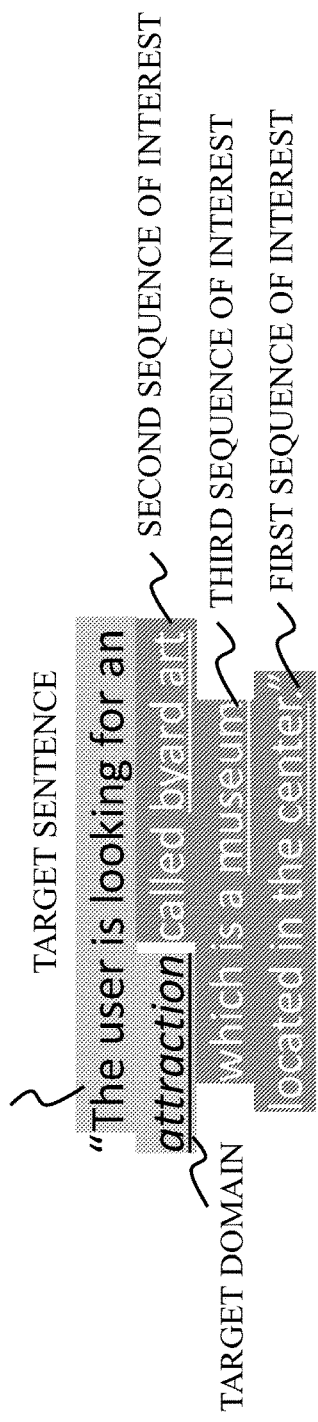
FIG. 9 is a diagram for describing an aspect of generating a dialogue state template according to an embodiment of the present application.

FIG. 8 is a flowchart embodying the operation of generating the dialogue state template (S4400) according to the embodiment of the present application. FIG. 9 is a diagram for describing an aspect of generating a dialogue state template according to an embodiment of the present application.

The generating of the dialogue state template based on the extracted target sentence (S4400) according to the embodiment of the present application may include acquiring the reference sequence related to the target domain (S4410), acquiring the sequence of interest of the target sentence corresponding to the reference sequence by comparing the reference sequence with the target sentence and acquiring the slot value based on the target sequence related to the sequence of interest (S4420), and acquiring the slot name related to the reference sequence (S4430), and generating the dialogue state template based on the slot name and the slot value (S4440).

In the acquiring of the reference sequence related to the target domain (S4410) according to the embodiment of the present application, the device 1000 for tracking a dialogue state may acquire the reference sequence related to the target domain. In detail, the device 1000 for tracking a dialogue state may acquire at least one reference sequence included in the reference template information related to the target domain. For example, the device 1000 for tracking a dialogue state may acquire the reference template information related to the target domain related to the attraction, and acquire the first reference sequence ("located in the _" in FIG. 9), the second reference sequence ("called" in FIG. 9), and/or the third reference sequence ("which is a _" in FIG. 9) included in the reference template information.

In the acquiring of the sequence of interest of the target sentence corresponding to the reference sequence by comparing the reference sequence with the target sentence and the acquiring of the slot value based on the target sequence related to the sequence of interest (S4420), the device 1000 for tracking a dialogue state may acquire the sequence of interest included in the target sentence and corresponding to the reference sequence by comparing the reference sequence included in the reference template information with the target sentence. Also, the device 1000 for tracking a dialogue state may acquire the target sequence related to the sequence of interest and acquire the slot value based on the target sequence.

For example, the device 1000 for tracking a dialogue state may acquire the first sequence of interest ("located in the center") of the target sentence corresponding to the first reference sequence by comparing the target sentence with the first reference sequence ("located in the _" in FIG. 9) included in the reference template information. In addition, the device 1000 for tracking a dialogue state may acquire the first target sequence (e.g., "center") related to the first sequence of interest, and acquire the first slot value (e.g., "center") based on the first target sequence.

For example, the device 1000 for tracking a dialogue state may acquire the second sequence of interest ("called Byard Art") of the target sentence corresponding to the second reference sequence by comparing the target sentence with the second reference sequence ("called _" in FIG. 9) included in the reference template information. In addition, the device 1000 for tracking a dialogue state may acquire the second target sequence (e.g., "Byard Art") related to the second sequence of interest, and acquire the second slot value (e.g., "Byard Art") based on the second target sequence.

For example, the device 1000 for tracking a dialogue state may acquire the third sequence of interest ("which is a museum") of the target sentence corresponding to the third reference sequence by comparing the target sentence with the third reference sequence ("which is a _" in FIG. 9) included in the reference template information. In addition, the device 1000 for tracking a dialogue state may acquire the third target sequence (e.g., "museum") related to the third sequence of interest, and acquire the third slot value (e.g., "museum") based on the third target sequence.

In the acquiring of the slot name related to the reference sequence (S4430) according to the embodiment of the present application, the device 1000 for tracking a dialogue state may acquire the slot name related to the reference sequence included in the reference template information. For example, the device 1000 for tracking a dialogue state may acquire a first slot name (attraction-area in FIG. 9) related to a first reference sequence ("located in the _ in FIG. 9), a second slot name (attraction-name in FIG. 9) related to the second reference sequence ("called _ in FIG. 9"), and/or a third slot name (attraction-type in FIG. 9) related to the third reference sequence ("which is a _ in FIG. 9).

In the generating of the dialogue state template based on the slot name and the slot value (S4440) according to the embodiment of the present application, the device 1000 for tracking a dialogue state may generate the dialogue state template based on the slot name and the slot value. Specifically, the device 1000 for tracking a dialogue state may generate the dialogue state template by matching the slot name with the slot value acquired from the target sequence related to the slot name.

For example, the device for tracking a dialogue state may generate the dialogue state template by matching the first slot name (e.g., attraction-area in FIG. 9) with the first slot value (e.g., "center") acquired from the first target sequence (e.g., "center") related to the first slot name.

For example, the device for tracking a dialogue state may generate the dialogue state template by matching the second slot name (e.g., attraction-name in FIG. 9) with the second slot value (e.g., "Byard Art") acquired from the second target sequence (e.g., "Byard Art") related to the second slot name.

For example, the device for tracking a dialogue state may generate the dialogue state template by matching the third slot name (e.g., attraction-type in FIG. 9) with the third slot value (e.g., "museum") acquired from the third target sequence (e.g., "museum") related to the third slot name.

In addition, the device 1000 for tracking a dialogue state may generate the dialogue state template using the target domain. For example, the device 1000 for tracking a dialogue state may generate the dialogue state template by assigning the value related to the target domain (e.g., attraction).

Meanwhile, although not illustrated, the device 1000 for tracking a dialogue state may be configured to transmit the target dialogue data, the dialogue summary data, and/or the dialogue state template generated from the dialogue summary data to the training device 100 to additionally train the dialogue state tracking model, thereby improving the performance of the dialogue state tracking model.

In the above, the contents of generating the dialogue state template from the dialogue data centered on the domain related to the attraction have been described. However, this is only an example for convenience of explanation, and may be inferred and applied to any dialogue topic and dialogue domain, and should not be construed as being limited to a specific domain.

Also, in the above, the converter that generates the dialogue state template from the dialogue summary data has been mainly described. However, this is only for convenience of explanation, and the description of the converter generating the dialogue state template from the dialogue summary data may also be inferred and applied to the converter generating the dialogue summary sentence from the dialogue state data illustrated in FIG. 5. For example, a process of converting the dialogue state data into the dialogue summary sentence and a process of generating the dialogue state template from the dialogue summary data may be inverse transformations of each other. Specifically, the dialogue state data of FIG. 5 may include specific domain information, sentence prefix information preset for each specific domain, at least one slot name classified for each specific domain, a reference sequence related to each slot name, and/or slot values corresponding to each slot name (or reference sequence). In this case, the converter may be trained or configured to generate the dialogue summary sentence based on the domain information, the sentence prefix information, the slot name, the reference sequence, and/or the slot value included in the dialogue state data. More specifically, the converter may generate the dialogue summary sentence by assigning the slot value (e.g., center) to a predetermined sequence (e.g., "A") included in the reference sequence (e.g., "located in the A") and assigning the sentence prefix included in the sentence prefix information to the sentence sequence preceding the reference sequence.

According to the method, device, and system of tracking a dialogue state according to the embodiment of the present application, by using the artificially generated dialogue summary sentence as the training set for training the dialogue state tracking model, it is possible to train the dialogue state tracking model to achieve a certain level of performance with only a small amount of training data.

According to the method, device, and system of tracking a dialogue state according to the embodiment of the present application, by training the dialogue state tracing model using a relatively small amount of training data, it is possible to increase the computational speed during the training of the model.

Various operations of the device 1000 for tracking a dialogue state described above may be stored in the memory 1200 of the device 1000 for tracking a dialogue state, and the controller 1300 of the device 1000 for tracking a dialogue state may be provided to perform operations stored in the memory 1200.

Effects of the present invention are not limited to the above-described effects, and effects that are not mentioned will be clearly understood by those skilled in the art to which the present invention pertains from the present specification and the accompanying drawings.

Features, structures, effects, etc., described in the above embodiments are included in at least one embodiment of the present disclosure, and are not necessarily limited only to one embodiment. Furthermore, features, structures, effects, etc., illustrated in each embodiment can be practiced by being combined or modified for other embodiments by those of ordinary skill in the art to which the embodiments pertain. Accordingly, the contents related to such combinations and modifications should be interpreted as being included in the scope of the present invention.

Although exemplary embodiments of the present invention have been mainly described hereinabove, this is only an example and does not limit the present invention. Those skilled in the art to which the present invention pertains may understand that several modifications and applications that are not described in the present specification may be made without departing from the spirit of the present invention. That is, each component specifically shown in the embodiment may be implemented by modification. In addition, differences related to these modifications and applications are to be interpreted as being included in the scope of the present specification as defined by the following claims.

What is claimed is:

1. A method of tracking a dialogue state, which is performed by a device for tracking a dialogue state that acquires target dialogue data and generates a dialogue state template based on the target dialogue data, the method comprising:

acquiring a trained dialogue state tracking model;

acquiring the target dialogue data;

acquiring dialogue summary data from the target dialogue data using the dialogue state tracking model; and generating the dialogue state template from the dialogue summary data, wherein the dialogue state tracking model includes an input layer for receiving the target dialogue data, an output layer for outputting the dialogue summary data, and a hidden layer having a plurality of nodes connecting the input layer and the output layer, and is trained using a training set that includes dialogue data and a dialogue summary sentence generated from dialogue state data related to the dialogue data, wherein the dialogue state tracking model is trained by generating the dialogue summary sentence based on the dialogue state data using a converter which is pre-trained language model (PLM), and the PLM is one of Bidirectional Encoder Representations from Transformers (BERT), Robustly Optimized BERT Approach (ROBERTa), Bayesian Additive Regression Trees (BART) and Sequence-to-Sequence (Seq2Seq), wherein the dialogue state tracking model is configured to receive the dialogue data through the input layer and output a dialogue summary prediction value through the output layer during training, and is trained by updating a parameter of at least one node included in the dialogue state tracking model based on a similarity between the dialogue summary prediction value and the dialogue summary sentence, and wherein the generating of the dialogue state template includes:

identifying a target sentence prefix included in the dialogue summary data, determining a target domain related to the target summary data based on the identified target sentence prefix, extracting at least one target sentence related to the target domain from among a plurality of sentences included in the dialogue summary data, and generating the dialogue state template based on the extracted target sentence.

2. The method of claim 1, wherein the generating of the dialogue state template includes:

acquiring a reference sequence related to the target domain;

acquiring a sequence of interest of the target sentence corresponding to the reference sequence by comparing the reference sequence with the target sentence and acquiring a slot value based on the target sequence related to the sequence of interest;

acquiring a slot name related to the reference sequence; and generating the dialogue state template based on the slot name and the slot value.

3. The method of claim 1, wherein the dialogue summary sentence is generated based on a slot value corresponding to a slot name included in the dialogue state data, a reference sequence related to the slot name, and a sentence prefix related to a domain included in the dialogue state data.

4. The method of claim 3, wherein the dialogue summary sentence is generated by assigning the slot value to a predetermined sequence of the reference sequence and assigning the sentence prefix to a sequence preceding the reference sequence.

5. A non-transitory computer-readable recording medium in which a computer program executed by a computer is recorded, the computer program comprising:

acquiring a trained dialogue state tracking model;

acquiring target dialogue data;

acquiring dialogue summary data from the target dialogue data using the dialogue state tracking model; and generating a dialogue state template from the dialogue summary data, wherein the dialogue state tracking model includes an input layer for receiving the target dialogue data, an output layer for outputting the dialogue summary data, and a hidden layer having a plurality of nodes connecting the input layer and the output layer, and is trained using a training set that includes dialogue data and a dialogue summary sentence generated from dialogue state data related to the dialogue data, wherein the dialogue state tracking model is trained by generating the dialogue summary sentence based on the dialogue state data using a converter which is pre-trained language model (PLM), and the PLM is one of Bidirectional Encoder Representations from Transformers (BERT), Robustly Optimized BERT Approach (ROBERTa), Bayesian Additive Regression Trees (BART) and Sequence-to-Sequence (Seq2Seq), wherein the dialogue state tracking model is configured to receive the dialogue data through the input layer and output a dialogue summary prediction value through the output layer during training, and is trained by updating a parameter of at least one node included in the dialogue state tracking model based on a similarity between the dialogue summary prediction value and the dialogue summary sentence, and wherein the generating of the dialogue state template includes:

identifying a target sentence prefix included in the dialogue summary data, determining a target domain related to the target summary data based on the identified target sentence prefix, extracting at least one target sentence related to the target domain from among a plurality of sentences included in the dialogue summary data, and generating the dialogue state template based on the extracted target sentence.

6. The non-transitory computer-readable recording medium of claim 5, wherein the generating of the dialogue state template includes:

acquiring a reference sequence related to the target domain;

acquiring a sequence of interest of the target sentence corresponding to the reference sequence by comparing the reference sequence with the target sentence and acquiring a slot value based on the target sequence related to the sequence of interest;

acquiring a slot name related to the reference sequence; and generating the dialogue state template based on the slot name and the slot value.

7. A device for tracking a dialogue state that acquires target dialogue data and generates a dialogue state template based on the target dialogue data, the device comprising:

a transceiver configured to acquire the target dialogue data; and a controller configured to acquire the target dialogue data through the transceiver and generate the dialogue state template based on the target dialogue data, wherein the controller is configured to acquire a trained dialogue state tracking model, acquire dialogue summary data from the target dialogue data using the dialogue state tracking model, and generate the dialogue state template from the dialogue summary data, and the dialogue state tracking model includes an input layer for receiving the target dialogue data, an output layer for outputting the dialogue summary data, and a hidden layer having a plurality of nodes connecting the input layer and the output layer, and is trained using a training set that includes dialogue data and a dialogue summary sentence generated from dialogue state data related to the dialogue data, wherein the dialogue state tracking model is trained by generating the dialogue summary sentence based on the dialogue state data using a converter which is pre-trained language model (PLM), and the PLM is one of Bidirectional Encoder Representations from Transformers (BERT), Robustly Optimized BERT Approach (ROBERTa), Bayesian Additive Regression Trees (BART) and Sequence-to-Sequence (Seq2Seq), wherein the dialogue state tracking model is configured to receive the dialogue data through the input layer and output a dialogue summary prediction value through the output layer during training, and is trained by updating a parameter of at least one node included in the dialogue state tracking model based on a similarity between the dialogue summary prediction value and the dialogue summary sentence, and wherein the generating of the dialogue state template includes:

identifying a target sentence prefix included in the dialogue summary data, determining a target domain related to the target summary data based on the identified target sentence prefix, extracting at least one target sentence related to the target domain from among a plurality of sentences included in the dialogue summary data, and generating the dialogue state template based on the extracted target sentence.

8. The device of claim 7, wherein the generating of the dialogue state template includes:

acquiring a reference sequence related to the target domain;

acquiring a sequence of interest of the target sentence corresponding to the reference sequence by comparing the reference sequence with the target sentence and acquiring a slot value based on the target sequence related to the sequence of interest;

acquiring a slot name related to the reference sequence; and generating the dialogue state template based on the slot name and the slot value.

* * * * *